United States Patent
Cao et al.

(10) Patent No.: US 8,610,843 B2
(45) Date of Patent: Dec. 17, 2013

(54) BACKLIGHT MODULE AND LIQUID CRYSTAL DISPLAY APPARATUS

(75) Inventors: Qian Cao, Shenzhen (CN); Poying Lin, Shenzhen (CN); Yicheng Kuo, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 406 days.

(21) Appl. No.: 12/996,336

(22) PCT Filed: Sep. 2, 2010

(86) PCT No.: PCT/CN2010/076559
§ 371 (c)(1),
(2), (4) Date: Dec. 3, 2010

(87) PCT Pub. No.: WO2012/012957
PCT Pub. Date: Feb. 2, 2012

(65) Prior Publication Data
US 2012/0057103 A1    Mar. 8, 2012

(30) Foreign Application Priority Data
Jul. 30, 2010    (CN) .......................... 2010 1 0245679

(51) Int. Cl.
G02F 1/13357    (2006.01)
(52) U.S. Cl.
USPC .............................. 349/61; 349/65; 362/97.3
(58) Field of Classification Search
None
See application file for complete search history.

(56) References Cited

U.S. PATENT DOCUMENTS

| | | | |
|---|---|---|---|
| 2009/0097271 A1* | 4/2009 | Chen et al. | 362/612 |
| 2009/0135592 A1* | 5/2009 | Hamada | 362/231 |
| 2010/0053496 A1* | 3/2010 | Park et al. | 349/61 |
| 2010/0245227 A1* | 9/2010 | Chen et al. | 345/102 |
| 2012/0057102 A1* | 3/2012 | Cao et al. | 349/65 |
| 2012/0113681 A1* | 5/2012 | Zheng et al. | 362/612 |

FOREIGN PATENT DOCUMENTS

| | | |
|---|---|---|
| CN | 101390004 A | 3/2009 |
| CN | 101622494 A | 1/2010 |
| CN | 101634777 A | 1/2010 |
| CN | 101655639 A | 2/2010 |
| CN | 101666429 A | 3/2010 |
| JP | 2002109936 A | 4/2002 |
| WO | 2010004797 A1 | 1/2010 |

OTHER PUBLICATIONS

English version of written opinion issued for PCT/CN2010/076559, mailing date May 12, 2011.*

* cited by examiner

*Primary Examiner* — Mike Stahl
(74) *Attorney, Agent, or Firm* — Sughrue Mion, PLLC

(57) ABSTRACT

The present invention discloses a backlight module and a liquid crystal display apparatus. The backlight module is employed in a liquid crystal display apparatus having a back plate and a plurality of LEDs. The liquid crystal display apparatus has a display area in accordance with the back plate and overlaps therewith, and the display area has a display area center line. The display area center line has a center corresponding to the LEDs. The LEDs are classified to belong to several positive voltage bins respectively. The LEDs belonging to a lower positive voltage bin are positioned closer to the center and the LEDs belonging to a higher positive voltage bin are positioned farther to the center.

18 Claims, 9 Drawing Sheets

BACKLIGHT MODULE AND LIQUID CRYSTAL DISPLAY APPARATUS

BACKGROUND OF THE INVENTION

1. Field of the Invention

The present invention generally relates to a backlight module and a liquid crystal display apparatus, and more particularly to a backlight module and a liquid crystal display apparatus capable of promoting LED temperature distribution.

2. Description of Prior Art

Nowadays, a liquid crystal display (LCD) is mainly manufactured by producing a backlight module composed by a backlight source, a housing and a diffuser plate first, and then assembling the backlight module with a liquid crystal front panel and a frame to compose a LCD module for manufacturing a final product. Generally, the backlight module which the backlight sources of the liquid crystal display utilizes Cold Cathode Fluorescent Lamps (CCFL) is now substantially replaced by a LED backlight module because the properties of the low power consumption and mercury free of the LED backlight module. Consequently, the CCFL backlight module will be history ultimately. The LED backlight module will replace overall with no doubt.

Now, the LEDs are generally laid out on the light bars in the backlight module utilizing the LEDs as the backlight sources. A predetermined specification will be introduced to select the mass-production LEDs and classify thereof. Generally, the indexes of performance employed for classifying the LEDs includes the brightness, the chrominance, the wavelength or the positive voltage bin of the LEDs. Accordingly, the LEDs can be classified by the aforesaid indexes. The display manufacturer generally selects the LEDs belonging to a major bin to be laid out on the light bars. On the other hand, the backlight uniformity of the display apparatus is extremely severe, therefore, the range to select the LEDs for the display manufacturer is essentially narrowed down. Therefore, the ratio of the selected LEDs in the mass-production LEDs is inevitably too small.

The aforesaid procedure will lead another issue. Because a set of LEDs belonging to the same bin is selected and utilized in the backlight module, and the cooling mechanism of the LEDs around the center is simpler than those at the periphery. Therefore, the temperatures of the LEDs around the center are higher than the temperatures of the LEDs at the periphery. Accordingly, non-uniformity issues of brightness and chrominance of backlight module exist.

SUMMARY OF THE INVENTION

For solving the drawbacks of aforementioned prior art, the present invention provides a backlight module and a liquid crystal display apparatus.

The present invention provides a backlight module, employed in a liquid crystal display apparatus having a back plate and a plurality of LEDs (Light Emitting Diode). The liquid crystal display apparatus has a display area in accordance with the back plate and overlaps therewith and the display area has a display area center line (AA area center line). The display area center line has a center corresponding to the LEDs. The LEDs are classified to belong to several positive voltage bins respectively. The LEDs belonging to a lower positive voltage bin are positioned closer to the center and the LEDs belonging to a higher positive voltage bin are positioned farther to the center.

The present invention provides a liquid crystal display apparatus comprising a backlight module. The backlight module comprises a back plate positioned at the bottom of the backlight module, the liquid crystal display apparatus has a display area in accordance with the back plate and overlaps therewith, and the display area has a display area center line; and a plurality of LEDs, classified to belong to several positive voltage bins respectively, and the display area center line has a center corresponding to the LEDs, wherein the LEDs belonging to a lower positive voltage bin are positioned closer to the center and the LEDs belonging to a higher positive voltage bin are positioned farther to the center.

With the LED backlight module and the liquid crystal display apparatus manufactured according to the present invention, not only the usage of the LEDs utilized for the liquid crystal display apparatus can be raised, but also the limitation of using one set of LEDs, which belong to the same bin in demand is no longer existing. Meanwhile, the LED temperature distribution in the LED backlight module can be promoted. Accordingly, the non-uniformity issues of brightness and chrominance of the backlight module and the liquid crystal display apparatus can be promoted.

DETAILED DESCRIPTION OF THE INVENTION

Figure 1:
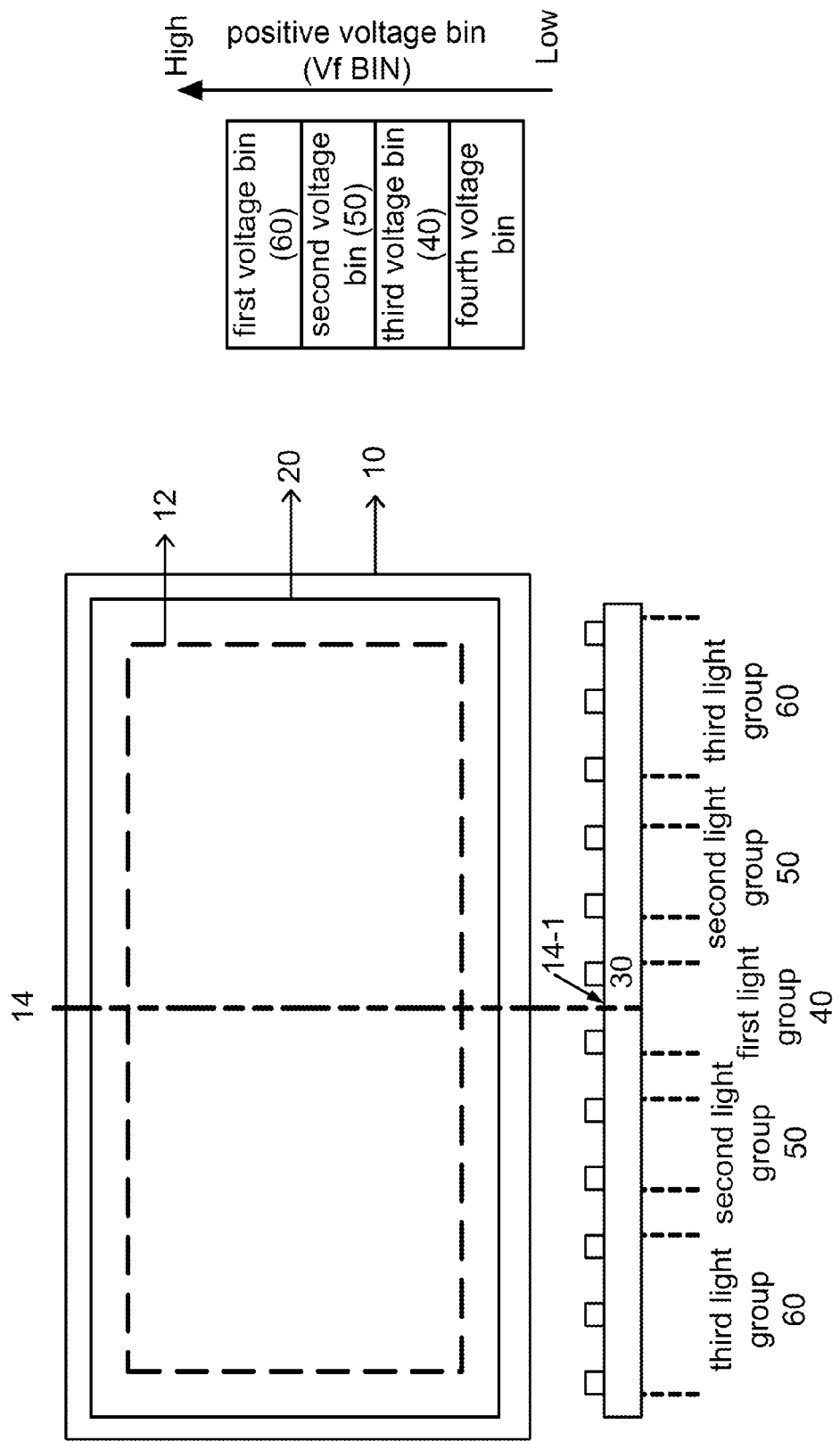
FIG. 1 shows a diagram of a LED backlight module according to the first embodiment of the present invention.

For a better understanding the aforementioned content of the present invention, preferable embodiments are illustrated in accordance with the attached figures for further explanation:

Please refer to FIG. 1, which shows a diagram of a LED backlight module according to the first embodiment of the present invention. The LED backlight module according to the first embodiment of the present invention is employed in a liquid crystal display apparatus. The backlight module in this embodiment is a side light type LED backlight module. As shown in the right of FIG. 1, a diagram of that a plurality of LEDs, classified according to positive voltage bin (VfBIN) is disclosed. The positive voltage of the first voltage bin is the highest. The positive voltage of the fourth voltage bin is the lowest. The LEDs 60 belong to the first voltage bin. The LEDs 50 belong to the second voltage bin. The LEDs 40 belong to the third voltage bin. The LEDs belonging to the fourth voltage bin will not be used. The LEDs 40 are arranged in a first light group. The LEDs 50 are arranged in a second light group. The LEDs 60 are arranged in a third light group. The LED backlight module shown in FIG. 1 comprises a back plate 10, a light guide plate 20, a light bar 30 and a plurality of LEDs 40-60. The light bar 30 corresponds to the light guide plate 20 and is positioned at a side of the light guide plate 20 perpendicular to the display center line 14. The plurality of LEDs 40-60 is positioned at the light bar 30 and faces the incident surface of the light guide plate 20. The incident surface of the light guide plate 20 is a plane. The liquid crystal display apparatus comprises a display area 12 in accordance with the back plate 10 and overlaps therewith. The display area 12 has a display area center line 14 (AA area center line). The display area center line 14 has a center 14-1 corresponding to the LEDs. In this embodiment, the LEDs 40 (the first light group) belonging to the lowest positive voltage bin are positioned closest to the position of the center 14-1. The LEDs 60 (the third light group) belonging to the highest positive voltage bin are positioned farthest to the position of the center 14-1. The LEDs 50 (the second light group) are positioned among the LEDs 40 (the first light group) and the LEDs 60 (the third light group).

Figure 2:
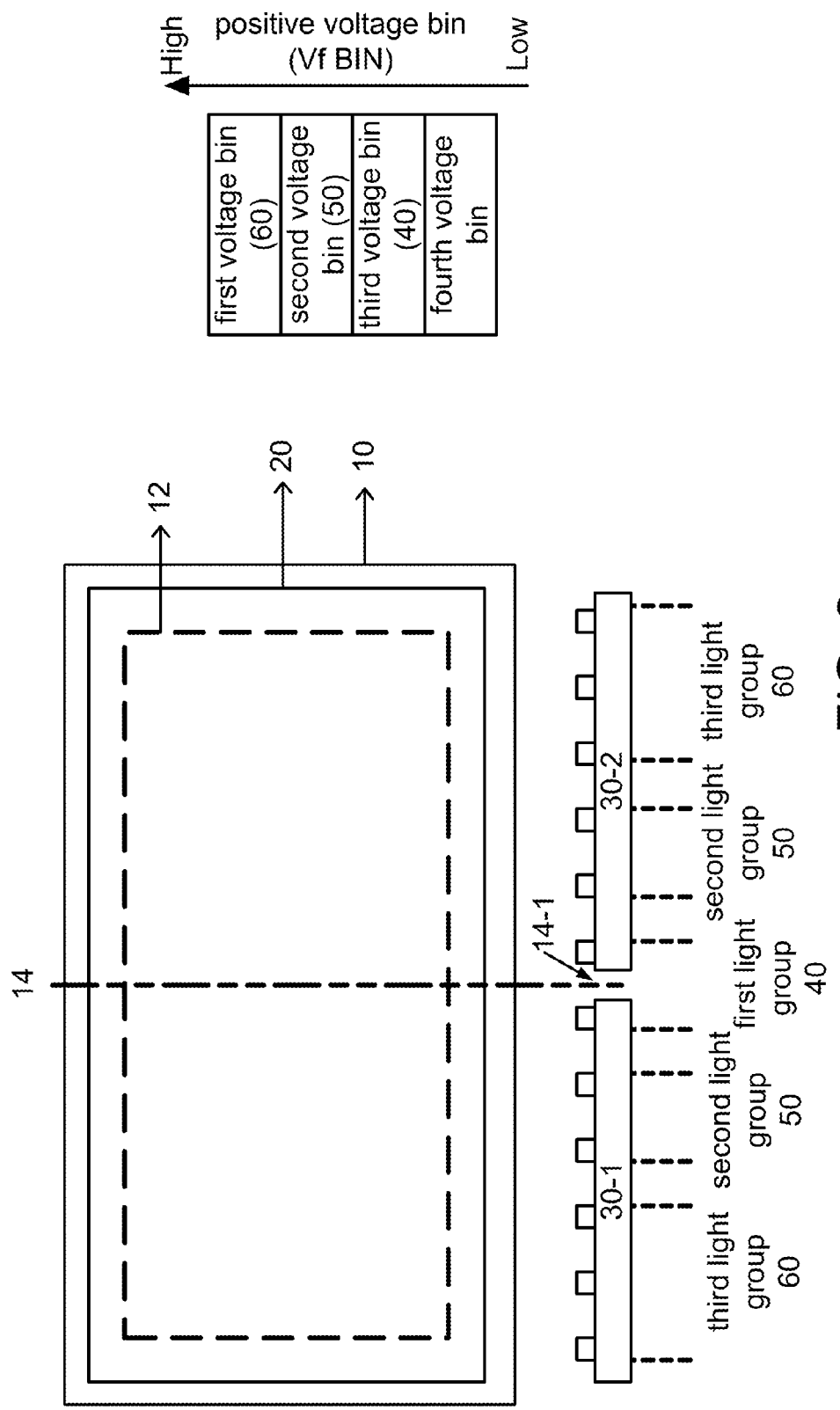
FIG. 2 shows a diagram of a LED backlight module according to the second embodiment of the present invention.

Please refer to FIG. 2. FIG. 2 shows a diagram of a LED backlight module according to the second embodiment of the present invention. The backlight module in this embodiment is a side light type LED backlight module. As shown in the right of FIG. 2, a diagram of that a plurality of LEDs, classified according to positive voltage bin (Vf BIN) is disclosed. The positive voltage of the first voltage bin is the highest. The positive voltage of the fourth voltage bin is the lowest. The LEDs 60 belong to the first voltage bin. The LEDs 50 belong to the second voltage bin. The LEDs 40 belong to the third voltage bin. The LEDs belonging to the fourth voltage bin will not be used. The LEDs 40 are arranged in a first light group. The LEDs 50 are arranged in a second light group. The LEDs 60 are arranged in a third light group. The LED backlight module comprises a back plate 10, a light guide plate 20, a light bar 30-1, a light bar 30-2 and a plurality of LEDs 40-60. The liquid crystal display apparatus comprises a display area 12 in accordance with the back plate 10 and overlaps therewith. The display area 12 has a display area center line 14. The display area center line 14 has a center 14-1 corresponding to the LEDs. The light bar 30-1 and the light bar 30-2 are symmetrically laid out regarding the center 14-1 and positioned at a side of the light guide plate 20 perpendicular to the display center line 14. The plurality of LEDs 40, 50 and 60 is positioned at the light bar 30-1 and the light bar 30-2 and faces the incident surface of the light guide plate 20. The incident surface of the light guide plate 20 is a plane. In this embodiment, the LEDs 40 (the first light group) belong the lowest positive voltage bin are positioned at the light bar 30-1 and the light bar 30-2 closest to the position of the center 14-1. The LEDs 60 (the third light group) belong the highest positive voltage bin are positioned at the light bar 30-1 and the light bar 30-2 farthest to the position of the center 14-1.

Figure 3:
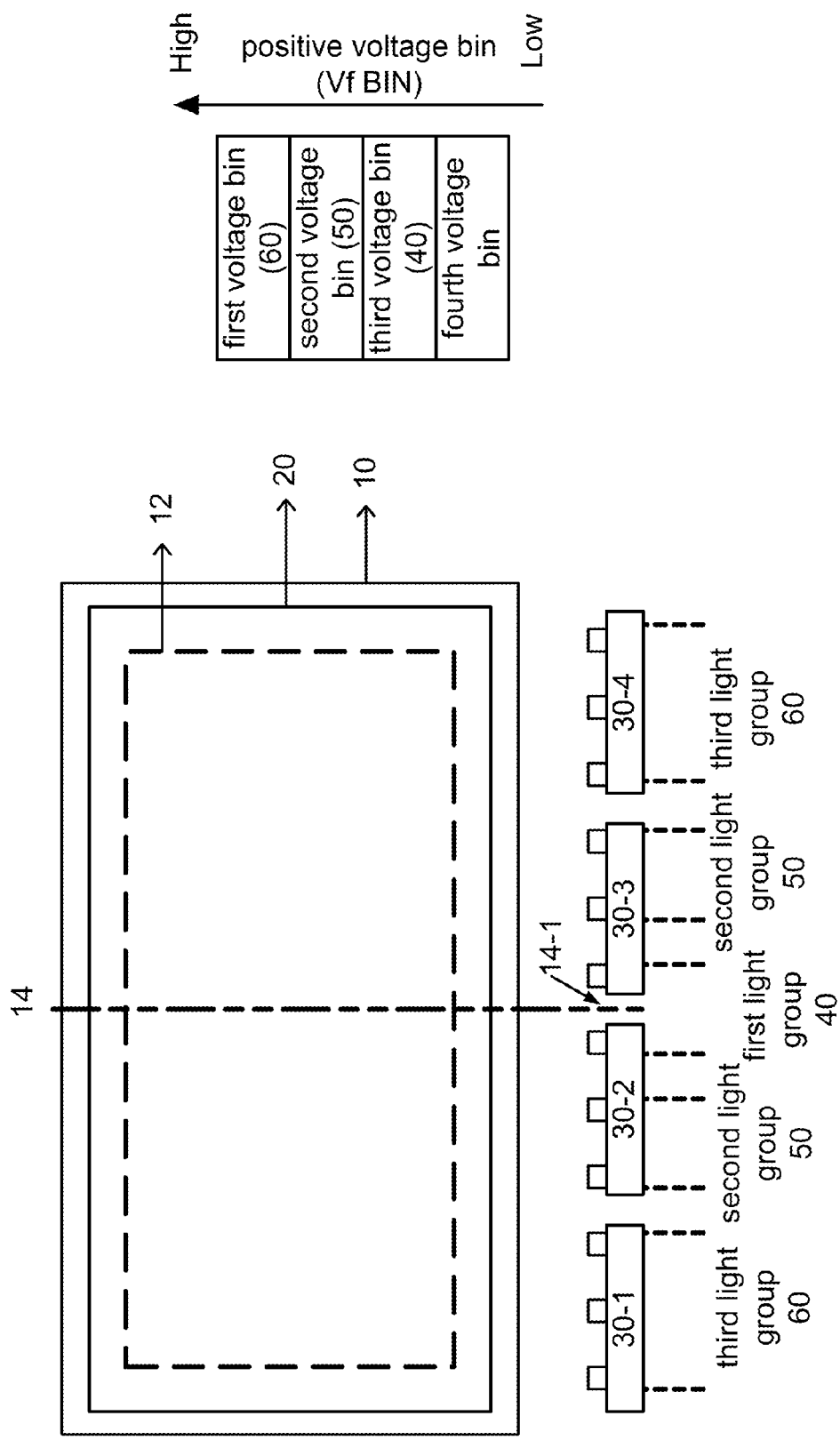
FIG. 3 shows a diagram of a LED backlight module according to the third embodiment of the present invention.

Please refer to FIG. 3, which shows a diagram of a LED backlight module according to the third embodiment of the present invention. The backlight module in this embodiment is a side light type LED backlight module. As shown in the right of FIG. 3, a diagram of that a plurality of LEDs, classified according to positive voltage bin (Vf BIN) is disclosed. The positive voltage of the first voltage bin is the highest. The positive voltage of the fourth voltage bin is the lowest. The LEDs 60 belong to the first voltage bin. The LEDs 50 belong to the second voltage bin. The LEDs 40 belong to the third voltage bin. The LEDs belonging to the fourth voltage bin will not be used. The LEDs 40 are arranged in a first light group. The LEDs 50 are arranged in a second light group. The LEDs 60 are arranged in a third light group. The LED backlight module comprises a back plate 10, a light guide plate 20, four light bars 30-1, 30-2, 30-3, 30-4 and a plurality of LEDs 40-60. The liquid crystal display apparatus comprises a display area 12 in accordance with the back plate 10 and overlaps therewith. The display area 12 has a display area center line 14. The display area center line 14 has a center 14-1 corresponding to the LEDs. The light bars 30-1, 30-2, 30-3, 30-4 are symmetrically laid out regarding the center 14-1 and positioned at a side of the light guide plate 20 perpendicular to the display center line 14. The LEDs 40-60 correspond to the light guide plate 20 and face the incident surface of the light guide plate 20. The incident surface of the light guide plate 20 is a plane. The light bars 30-2, 30-3 are closet to the center 14-1. The light bars 30-1, 30-4 are farthest to the center 14-1. The LEDs 40 (the first light group) are positioned at the light bars 30-2 and 30-3 closest to the position of the center 14-1. The LEDs 50 (the third light group) are positioned at the light bars 30-2 and 30-3 farther to the position of the center 14-1. The LEDs 60 (the third light group) are positioned farthest to the position of the center 14-1.

Figure 4:
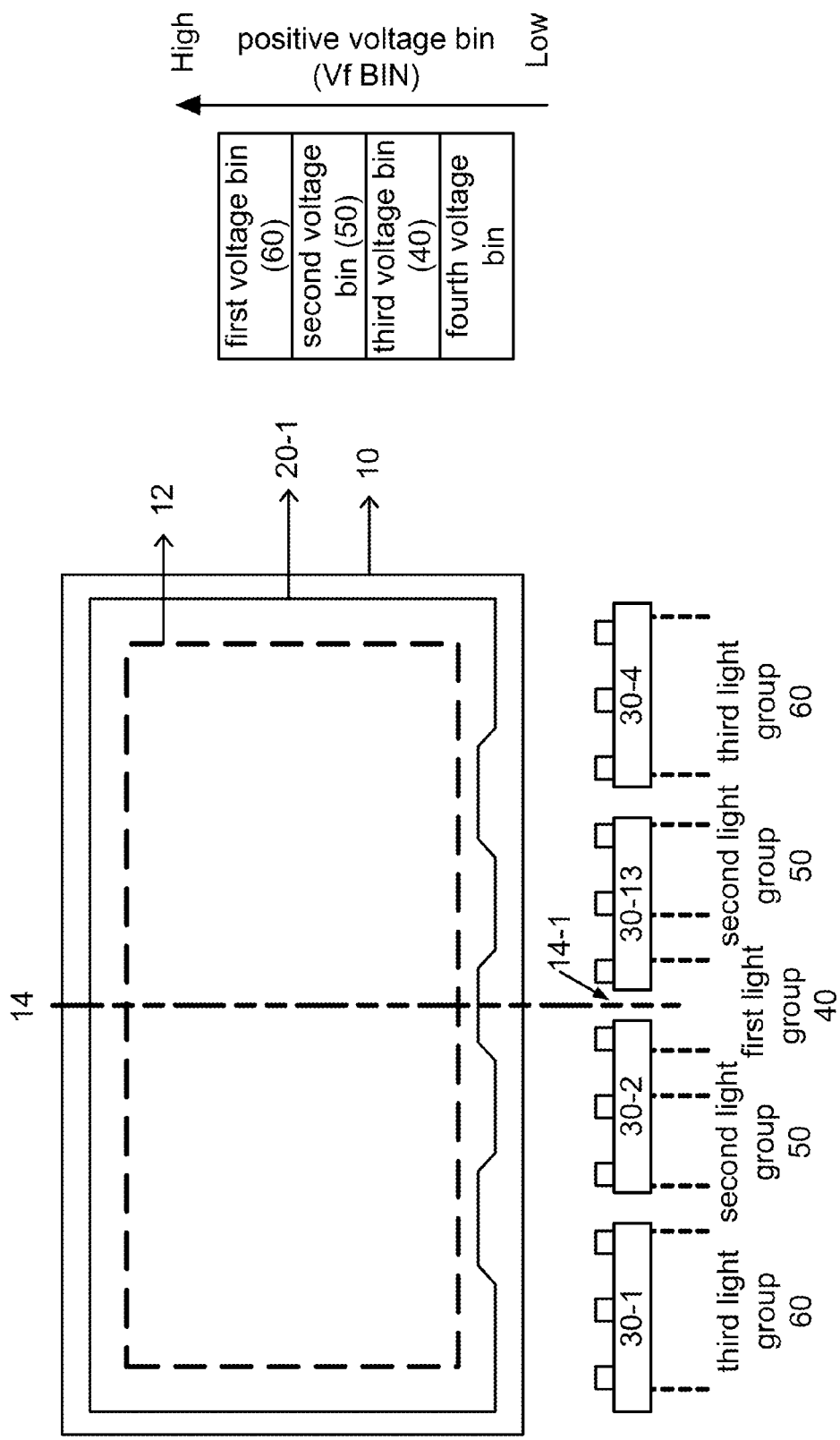
FIG. 4 shows a diagram of a LED backlight module according to the fourth embodiment of the present invention.
Figure 5:
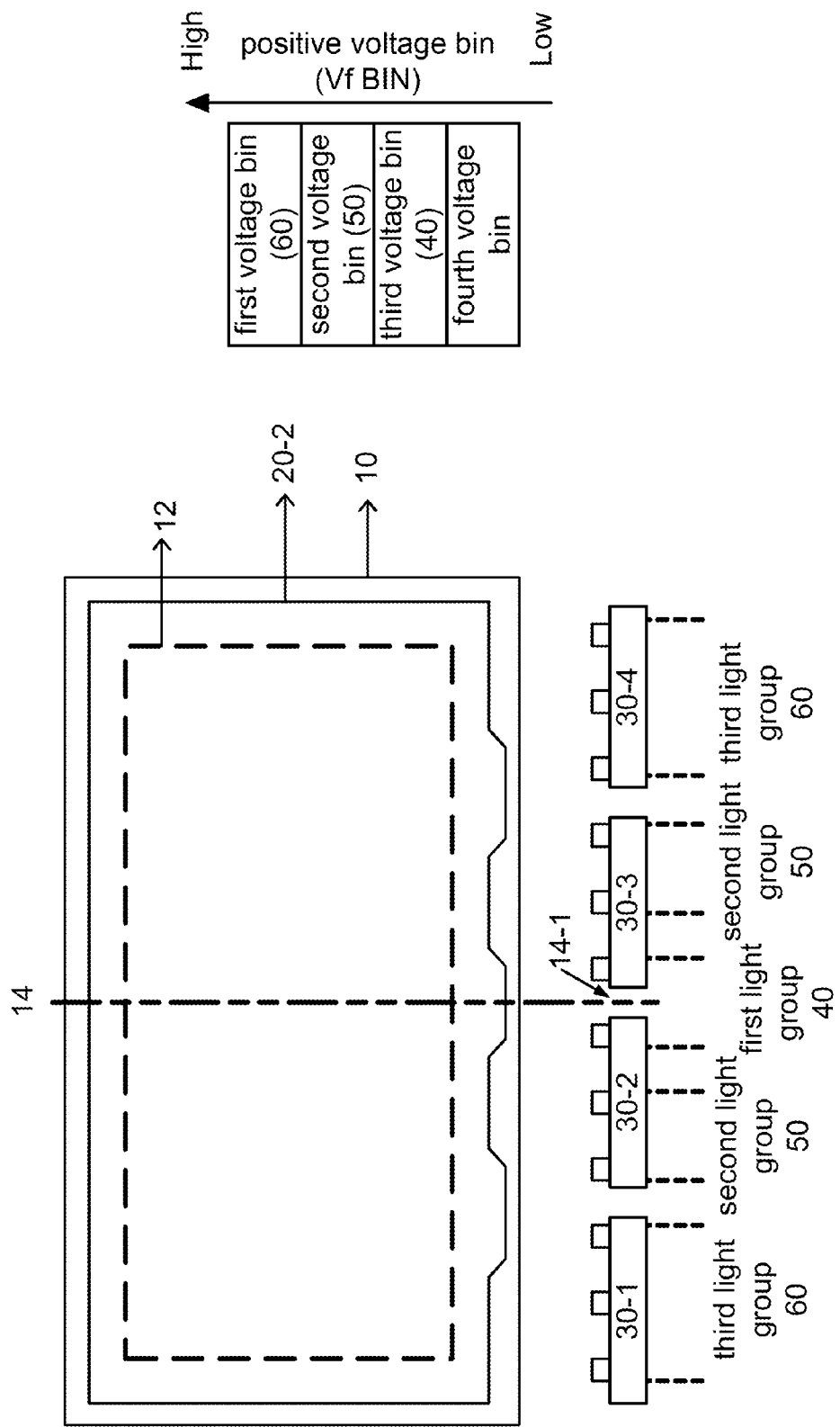
FIG. 5 shows a diagram of a LED backlight module according to the fifth embodiment of the present invention.
Figure 6:
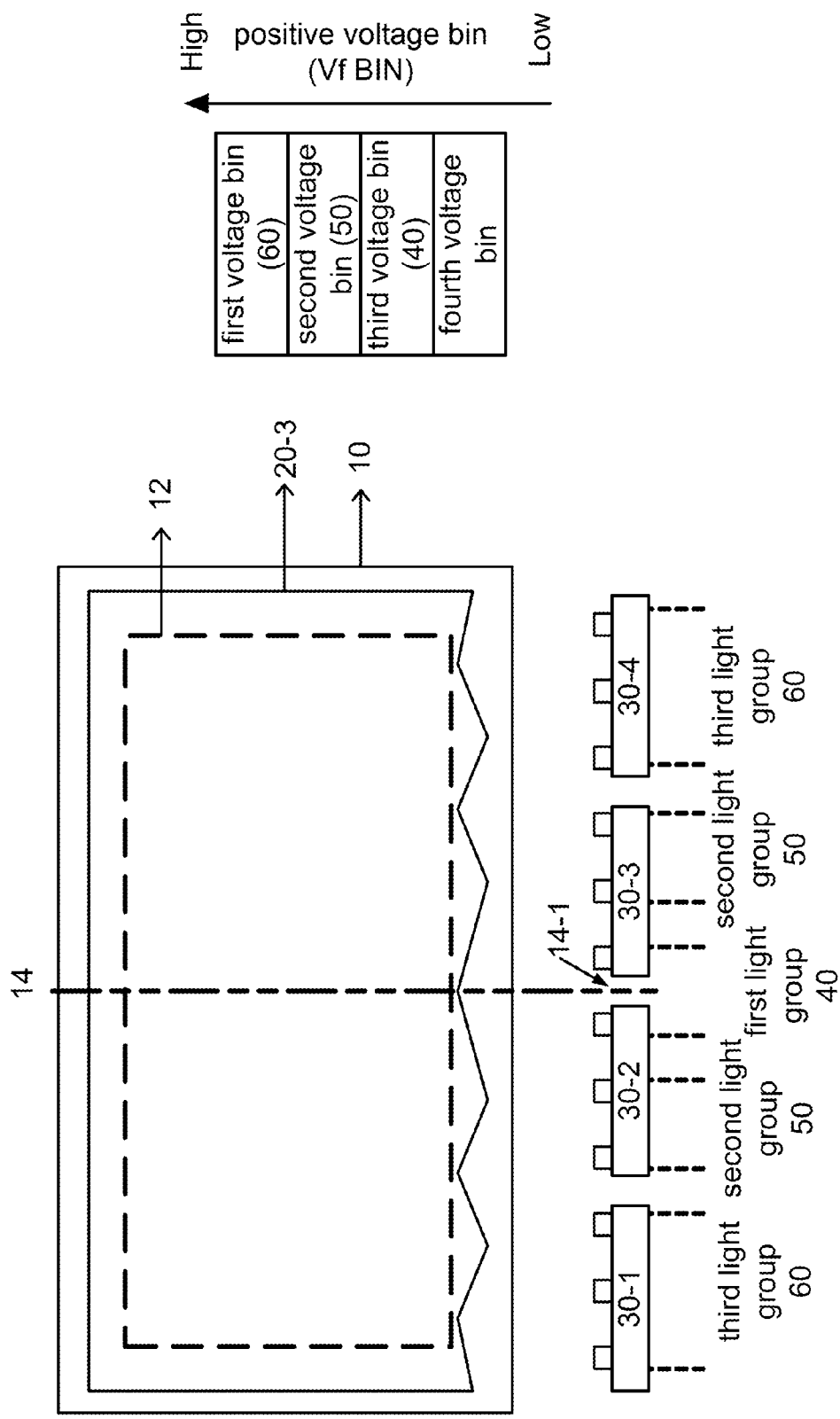
FIG. 6 shows a diagram of a LED backlight module according to the sixth embodiment of the present invention.

Please refer to FIG. 4, FIG. 5 and FIG. 6, which respectively show LED backlight modules according to the fourth, fifth and sixth embodiments of the present invention. The backlight modules in the fourth, fifth and sixth embodiments are similar to the backlight module in the third embodiment. As shown in FIG. 4, the difference is that the incident surface of the light guide plate 20-1 facing the light bars 30-1, 30-2, 30-3, 30-4 has a plurality of concaves. As shown in FIG. 5, the incident surface of the light guide plate 20-2 facing the light bars 30-1, 30-2, 30-3, 30-4 has a plurality of convexes in the fifth embodiment. As shown in FIG. 6, the incident surface of the light guide plate 20-3 facing the light bars 30-1, 30-2, 30-3, 30-4 is a jagged structure surface in the sixth embodiment.

Figure 7:
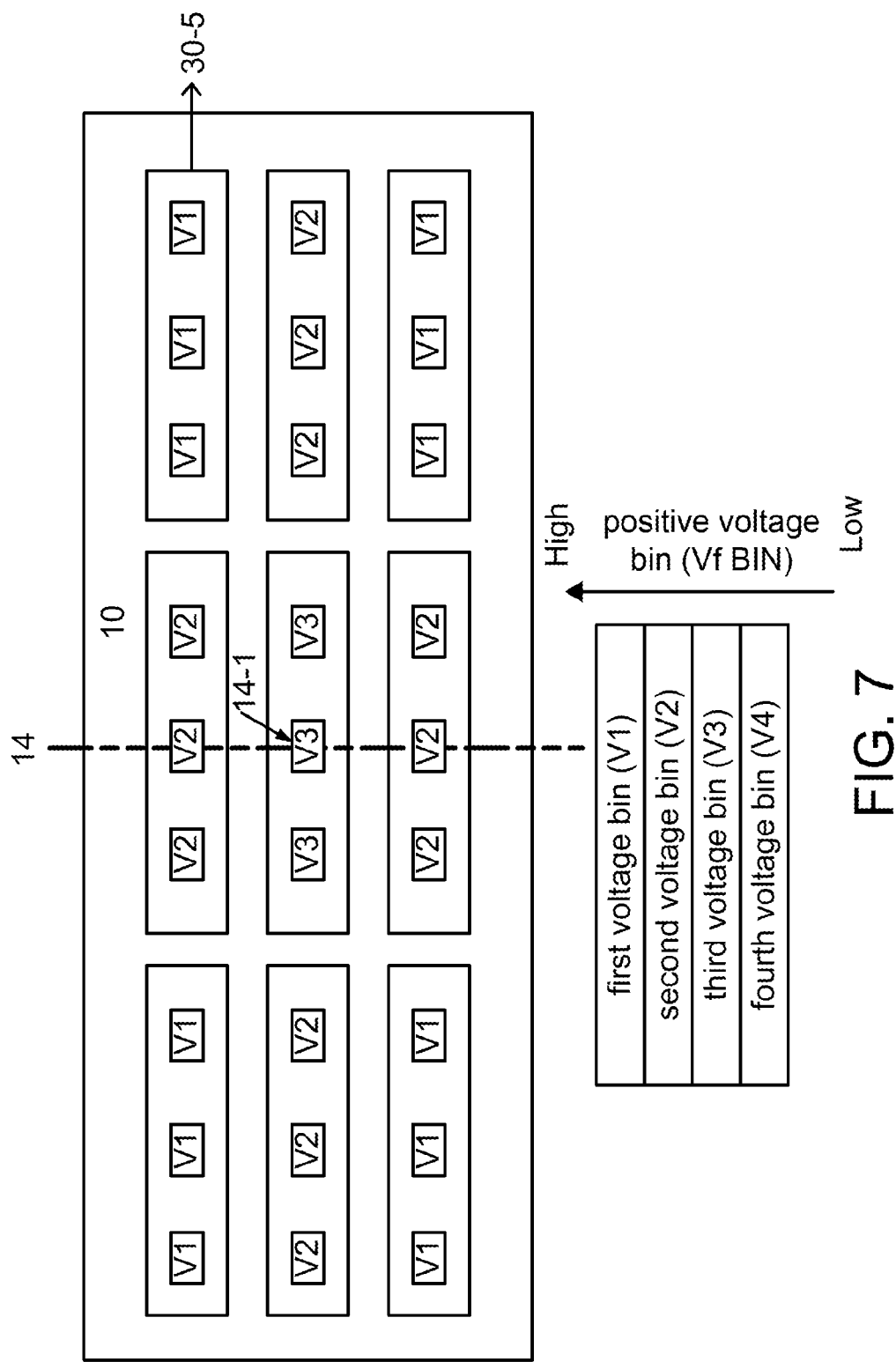
FIG. 7 shows a diagram of a LED backlight module according to the seventh embodiment of the present invention.

Please refer to FIG. 7, which shows a diagram of a LED backlight module according to the seventh embodiment of the present invention. The backlight module in this embodiment is a direct light type LED backlight module. The LED backlight module comprises a back plate 10, a plurality of light bars 30-5 and a plurality of LEDs. The liquid crystal display apparatus comprises has a display area center line 14. The display area center line 14 has a center 14-1 corresponding to the LEDs around the central position of the back plate 10. The center 14-1 is substantially at the central position of the back plate 10. As shown in the lower of FIG. 7, a diagram of that a plurality of LEDs, classified according to positive voltage bin (Vf BIN) is disclosed. The plurality of LEDs is classified into four bins, the first voltage bin (V1), the second voltage bin (V2), the third voltage bin (V3) and the fourth voltage bin (V4). The positive voltage of the first voltage bin (V1) is the highest. The positive voltage of the fourth voltage bin (V4) is the lowest. The plurality of light bars 30-5 is laid out on the back plate 10. As shown in FIG. 7, the LEDs belonging to the fourth voltage bin will not be used. The LEDs belonging to the third voltage bin (V3) are positioned on the light bar at the center 14-1. The LEDs belonging to the second voltage bin (V2) are positioned on the light bars at the top, the bottom, the left and the right of the center 14-1. The LEDs belonging to the first voltage bin (V1) are positioned on the light bars at the upper right, the lower right, the upper left and the lower left of the center 14-1. However, please notice that that the amount of the light bar 30-5 is not specifically limited in this embodiment.

Figure 8:
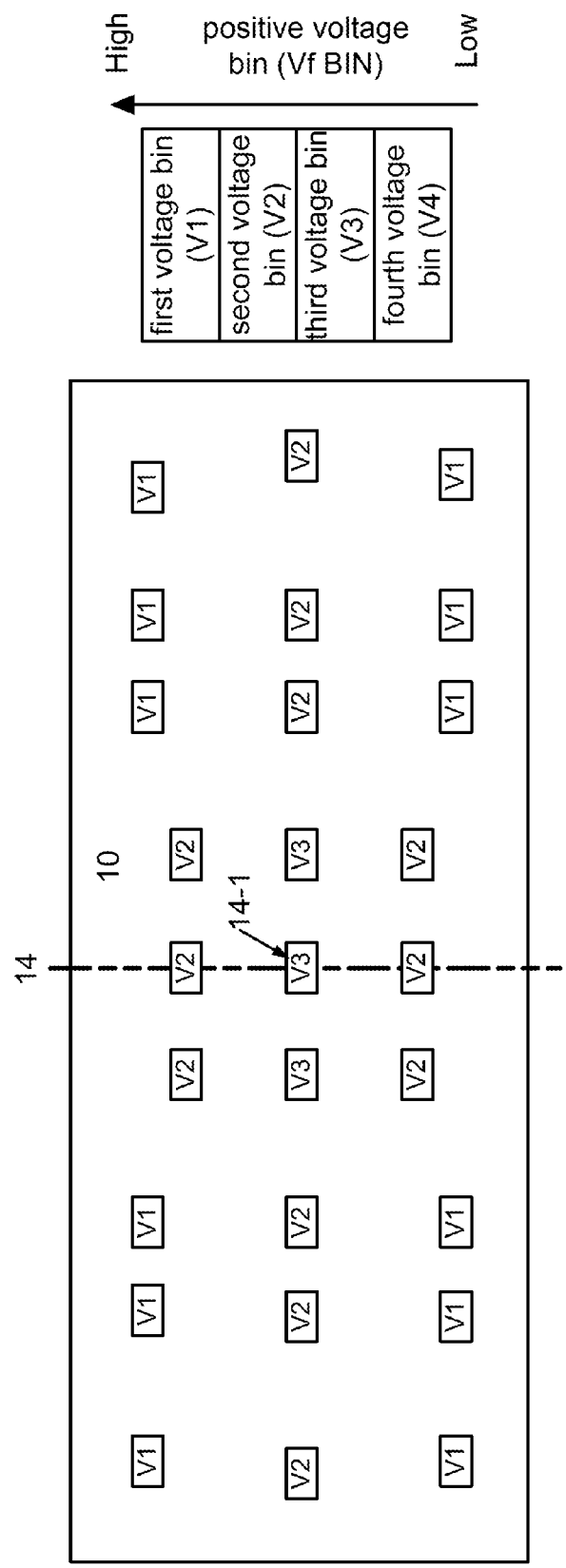
FIG. 8 shows a diagram of a LED backlight module according to the eighth embodiment of the present invention.

Please refer to FIG. 8, which shows a diagram of a LED backlight module according to the eighth embodiment of the present invention. The backlight module in this embodiment is a direct light type LED backlight module. As shown in the lower of FIG. 8, a diagram of that a plurality of LEDs, classified according to positive voltage bin (Vf BIN) is disclosed. The plurality of LEDs is classified into four bins, the first voltage bin (V1), the second voltage bin (V2), the third voltage bin (V3) and the fourth voltage bin (V4). The LED backlight module comprises a back plate 10 and a plurality of LEDs. The difference between the seventh embodiment and the eighth embodiment is that the LED backlight module does not comprise any light bars but the LEDs are directly laid out on the back plate 10. As shown in FIG. 8, the LEDs belonging to the third voltage bin (V3) are positioned around the center 14-1. The LEDs belonging to the second voltage bin (V2) are positioned at the top, the bottom, the left and the right of the center 14-1. The LEDs belonging to the first voltage bin (V1) are positioned at the upper right, the lower right, the upper left and the lower left of the center 14-1. However, please notice that that the amount of LED V1, V2, V3, V4 and their positions on the back plate 10 are not specifically limited in this embodiment.

Moreover, the present invention also provides a liquid crystal display apparatus utilizing any of the LED backlight modules described in the first embodiment~the eighth embodiment. The LED backlight module of the liquid crystal display apparatus according to the present invention comprises a back plate and a plurality of LEDs. The back plate is positioned at the bottom of the backlight module and is a portion of the backlight module. The liquid crystal display apparatus has a display area in accordance with the back plate and overlaps therewith. The display area has a display area center line. The plurality of LEDs is classified to belong to several positive voltage bins, respectively. The display area center line has a center corresponding to the LEDs. The LEDs belonging to a lower positive voltage bin are positioned closer to the center and the LEDs belonging to a higher positive voltage bin are positioned farther to the center.

Figure 9:
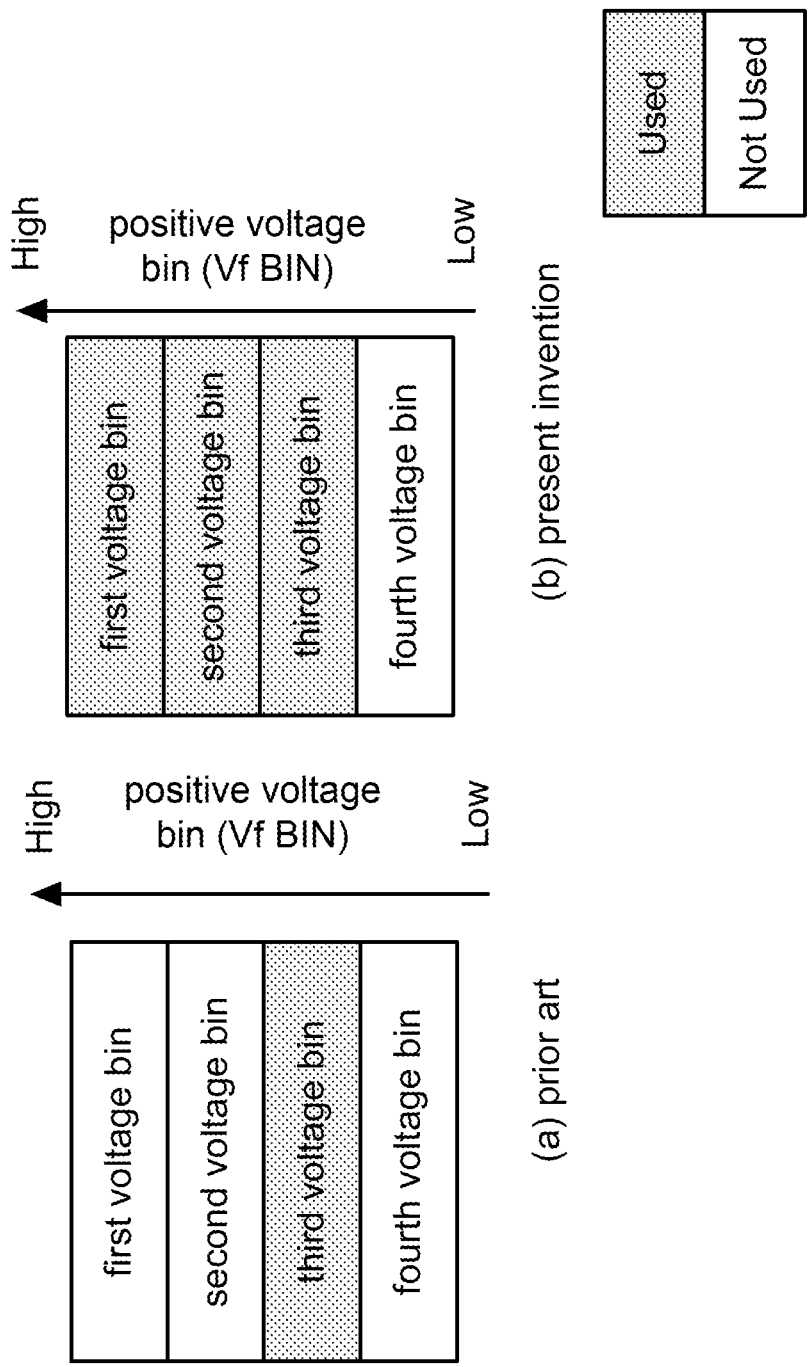
FIG. 9 shows an explanation diagram of raising a usage of the LEDs according to the present invention.

Please refer to FIG. 9, which shows an explanation diagram of raising an usage of the LEDs according to the present invention. As shown in FIG. 9(a), a diagram of that a plurality of LEDs for a backlight module, classified according to positive voltage bin (Vf BIN) in prior art is disclosed. Merely the LEDs belonging to the third voltage bin (V3) are used. However, according to the present invention, the LEDs belonging to the first, second and third voltage bins can be used for the backlight module. Furthermore, according to the first embodiment~the eighth embodiment in the present invention, the LEDs belonging to a lower positive voltage bin are positioned closer to the center and the LEDs belonging to a higher positive voltage bin are positioned farther to the center. Therefore, the temperature around the center of the backlight module can be reduced to promote the LED temperature distribution. Accordingly, the brightness and chrominance at the center and the brightness and chrominance at periphery can be more uniformly equivalent.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A backlight module, employed in a liquid crystal display apparatus, having a back plate and a plurality of Light emitting diodes, the liquid crystal display apparatus has a display area in accordance with the back plate and overlaps therewith, and the display area has a display area center line, and the display area center line has a center corresponding to the Light emitting diodes, characterized in that the Light emitting diodes are classified to belong to several positive voltage bins respectively, wherein the Light emitting diodes belonging to a lower positive voltage bin are positioned closer to the center and the Light emitting diodes belonging to a higher positive voltage bin are positioned farther from the center.

2. The backlight module of claim 1, characterized in that the backlight module is a direct light type backlight module.

3. The backlight module of claim 2, characterized in that the backlight module further comprises a plurality of light bars positioned on the back plate and the Light emitting diodes are positioned on the light bars.

4. The backlight module of claim 3, characterized in that the center is substantially at a center position of the back plate, the light bars are symmetrically laid out regarding the center and the Light emitting diodes are categorized into several light groups in accordance with the several positive voltage bins, wherein a light group belonging to a lower positive voltage bin is positioned on a light bar closer to the center and a light group belonging to a higher positive voltage bin is positioned on a light bar farther from the center, and a light group belonging to a positive voltage bin between the higher positive voltage bin and the lower positive voltage bin is positioned between the light group belonging to higher positive voltage bin and the light group belonging to the lower positive voltage bin.

5. The backlight module of claim 2, characterized in that the Light emitting diodes are directly laid out on the back plate.

6. The backlight module of claim 1, characterized in that the backlight module is a side light type backlight module further comprising a light guide plate positioned at a side perpendicular to the display center line.

7. The backlight module of claim 6, characterized in that the backlight module further comprises at least one light bar corresponding to the light guide plate wherein the said light bar is positioned at the side where the light guide plate is positioned, and the Light emitting diodes are positioned on the at least one light bar.

8. The backlight module of claim 7, characterized in that the at least one light bar is symmetrically laid out regarding the center and the Light emitting diodes are categorized into several light groups in accordance with the several positive voltage bins, wherein a light group belonging to a lower positive voltage bin is positioned on a light bar closer to the center and a light group belonging to a higher positive voltage bin is positioned on a light bar farther from the center, and a light group belonging to a positive voltage bin between the higher positive voltage bin and the lower positive voltage bin is positioned between the light group belonging to higher positive voltage bin and the light group belonging to the lower positive voltage bin.

9. The backlight module of claim 8, characterized in that the light groups respectively comprise Light emitting diodes classified to belong to the same positive voltage bin.

10. The backlight module of claim 6, characterized in that an incident surface of the light guide plate facing the at least one light bar is a plane or a jagged structure surface.

11. The backlight module of claim 7, characterized in that an incident surface of the light guide plate facing the at least one light bar is a plane or a jagged structure surface.

12. The backlight module of claim 8, characterized in that an incident surface of the light guide plate facing the at least one light bar is a plane or a jagged structure surface.

13. The backlight module of claim 9, characterized in that an incident surface of the light guide plate facing the at least one light bar is a plane or a jagged structure surface.

14. The backlight module of claim 6, characterized in that an incident surface of the light guide plate facing the at least one light bar comprises a plurality of concaves or a plurality of convexes.

15. The backlight module of claim 7, characterized in that an incident surface of the light guide plate facing the at least one light bar comprises a plurality of concaves or a plurality of convexes.

16. The backlight module of claim 8, characterized in that an incident surface of the light guide plate facing the at least one light bar comprises a plurality of concaves or a plurality of convexes.

17. The backlight module of claim 9, characterized in that an incident surface of the light guide plate facing the at least one light bar comprises a plurality of concaves or a plurality of convexes.

18. A liquid crystal display apparatus, comprising a backlight module, characterized in that the backlight module comprises:
  a back plate, positioned at the bottom of the backlight module, the liquid crystal display apparatus has a display area in accordance with the back plate and overlaps therewith, the display area has a display area center line; and
  a plurality of Light emitting diodes, classified to belong to several positive voltage bins respectively and the display area center line has a center corresponding to the Light emitting diodes,
wherein the Light emitting diodes belonging to a lower positive voltage bin are positioned closer to the center and the Light emitting diodes belonging to a higher positive voltage bin are positioned farther from the center.

* * * * *